Patented Jan. 15, 1946

2,393,156

UNITED STATES PATENT OFFICE 2,393,156

COMPOSITION OF MATTER

Carlin F. Gibbs, Cuyahoga Falls, Ohio, assignor to The B. F. Goodrich Company, New York, N. Y., a corporation of New York No Drawing. Application August 7, 1941, Serial No. 405,791

1 Claim. (Cl. 260—571)

This invention relates to a new composition of matter and pertains specifically to the class of compounds consisting of the hydroxy and alkoxy derivatives of alkenyl diarylamines.

These new compounds are useful as antioxidants or age-resisters, especially in rubber compositions. Any of the natural rubbers, such as caoutchouc, balata, gutta percha, latex, as well as artificial rubber isomers, and such synthetic rubbers as the copolymers of butadiene with acrylonitrile, styrene, isobutylene, methyl acrylate, methyl methacrylate, and the like may have their resistance to light and air greatly increased by the incorporation of a small amount, from 0.1 to 5.0% or more, of my new compounds in the rubber composition. The materials of my invention may also be used as age-resisters for oils which are easily oxidized, such as fish oils, linseed oil, tung oil, gasolines containing unsaturates, and the like.

My invention comprises those compounds having the structure

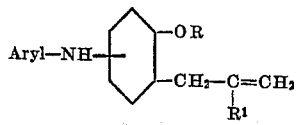

in which R is hydrogen or an alkyl group, and $R^1$ is a hydrogen atom or alkyl group. Among these compounds are 3-hydroxy-4-beta-methallyl-diphenylamine
3-methoxy-4-beta-methallyl-diphenylamine
3-beta-methallyl-4-hydroxy-diphenylamine
3-beta-methallyl-4-methoxy-diphenylamine
3-beta-methallyl-4-ethoxy-diphenylamine
3-beta-methallyl-4-isopropoxy-diphenylamine
3-beta-methallyl-4-methallyloxy-diphenylamine
2-hydroxy-3-beta-methallyl-diphenylamine
2-methoxy-3-beta-methallyl-diphenylamine
2-ethoxy-3-beta-methallyl-diphenylamine
2-methallyloxy-3-beta-methallyl-diphenylamine
3-hydroxy-4-beta-ethylallyl-diphenylamine
3-ethoxy-4-beta-propylallyl-diphenylamine
3-beta-ethylallyl-4-hydroxy-diphenylamine
3-beta-propylallyl-4-butoxy-diphenylamine
2-hydroxy-3-beta-methallyl phenyl-beta-naphthylamine
3-hydroxy-4-beta-methallyl phenyl-beta-naphthylamine
3-beta-methallyl-4-methoxy phenyl xenylamine and the like.

As a specific example of my invention I will describe the preparation of 3-beta-methallyl-4-hydroxy-diphenylamine and 3-beta-methallyl-4-beta-methallyloxy-diphenylamine. These materials may conveniently be prepared by reacting one molecular proportion of p-hydroxy diphenylamine with one molecular proportion of beta-methallyl chloride in the presence of about 1.5 molecular proportions of 10% alcoholic potash. The reaction is complete after the mixture has been refluxed for about two hours; the product may be separated by cooling the mixture, neutralizing, and filtering.

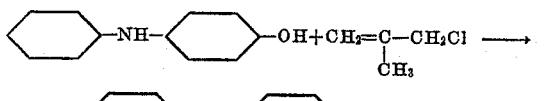
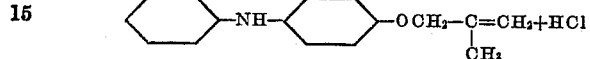

Rearrangement of the methallyl ether to the beta-methallyl hydroxy compound is readily accomplished by heating the ether with about one-half its weight of diethylaniline as solvent for about thirty to fifty minutes at 200° C. Other solvents such as dimethylaniline or various hydrocarbons may also be used. The product may be separated from the reaction mixture by distillation at reduced pressure. The material boils at 165° to 175° C. at 3 mm. pressure.

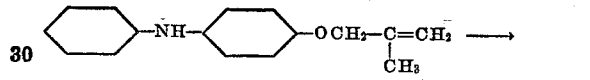
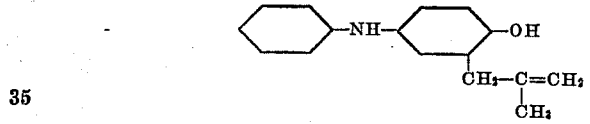

Similar compounds may be obtained by treating other beta-alkyl allyl ethers under similar conditions.

The beta-methallyloxy derivative of this compound is obtained by treating the foregoing compound with an equimolecular proportion of beta-methallyl chloride in the presence of about 50% molecular excess of 10% alcoholic potash, as in the first step of the synthesis.

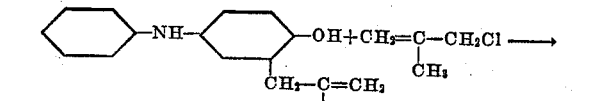
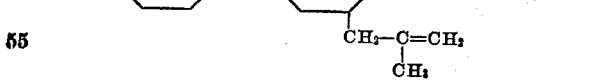

Other alkoxy and aralkoxy derivatives may be prepared by similar reactions. The nature of the alkenyl group and of the arylamino group may be varied by starting with the appropriate arylamino phenol and the appropriate beta-alkyl substituted allyl chloride or bromide. The beta-alkyl group keeps its same position in the hydrocarbon chain after the rearrangement of the ether. The position of the arylamino group in the benzene ring has little effect upon the reaction, although the position para to the hydroxy group appears to favor the reaction more than the other positions. It should be noted that in the product the alkenyl group is ortho to the hydroxy (or alkoxy) group. If one ortho position is blocked by the arylamino group, then the alkenyl group will occupy the other. The final etherification may be carried out with any alkyl or aralkyl halide, such as methyl, ethyl, propyl, butyl, cyclohexyl, benzyl, etc., chloride or bromide. Among the substituted allyl halides which may be employed as starting materials for the synthesis are beta-methallyl, beta-ethylallyl, beta-propylallyl, beta-isopropyl allyl, beta-butyl allyl, etc., chloride or bromide.

Although I have herein disclosed specific examples of my invention, I do not intend to limit myself solely thereto but only as indicated by the appended claim.

I claim:

3-beta-methallyl- 4 -methallyloxy - diphenylamine.

CARLIN F. GIBBS.